United States Patent [19]

Georgeff

[11] Patent Number: 4,994,942
[45] Date of Patent: Feb. 19, 1991

[54] VEHICLE TAIL LIGHT CONSTRUCTION
[75] Inventor: Robert B. Georgeff, Ferndale, Mich.
[73] Assignee: Chrysler Corporation, Highland Park, Mich.
[21] Appl. No.: 569,306
[22] Filed: Aug. 26, 1990
[51] Int. Cl.⁵ .............................................. B60Q 1/00
[52] U.S. Cl. ...................................... 362/80; 362/368
[58] Field of Search ..................... 362/61, 80, 83, 368, 362/396

[56]  References Cited
U.S. PATENT DOCUMENTS
4,751,619  6/1988  Philippe et al. ........................ 362/80
4,796,165  1/1989  Metti ..................................... 362/80

Primary Examiner—Stephen F. Husar
Attorney, Agent, or Firm—Edward A. Craig

[57] ABSTRACT

A tail light assembly is provided for a vehicle. The tail light assembly includes a main body portion having tabs on the lower end thereof. A bracket, including a pocket, is secured to the vehicle to receive the tabs. The upper end of the main body portion is secured to the vehicle body by use of fasteners. The tail light assembly may be removed for service by removing the fasteners from the upper end and pulling the tabs out of the bracket pocket.

4 Claims, 2 Drawing Sheets

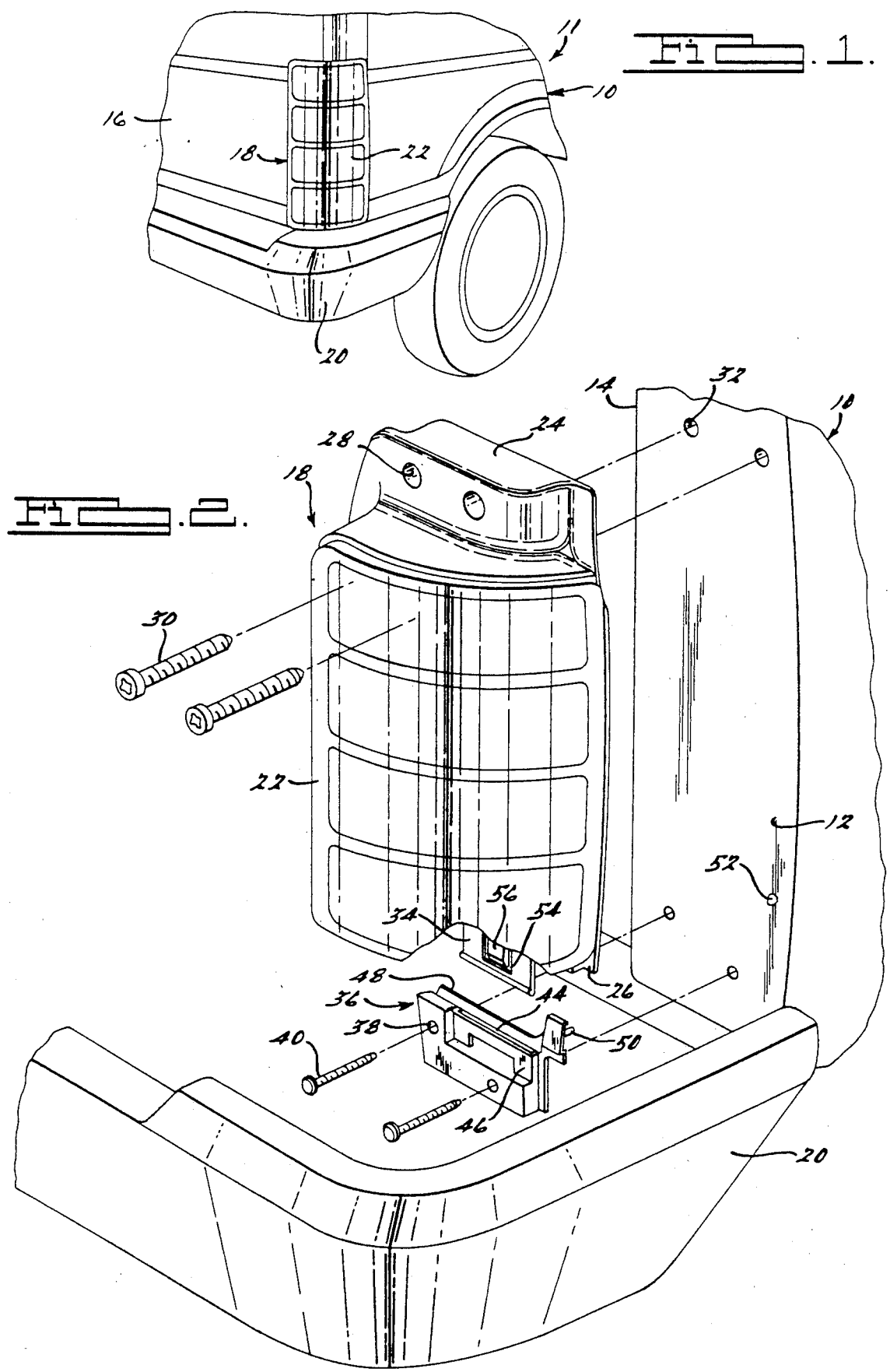

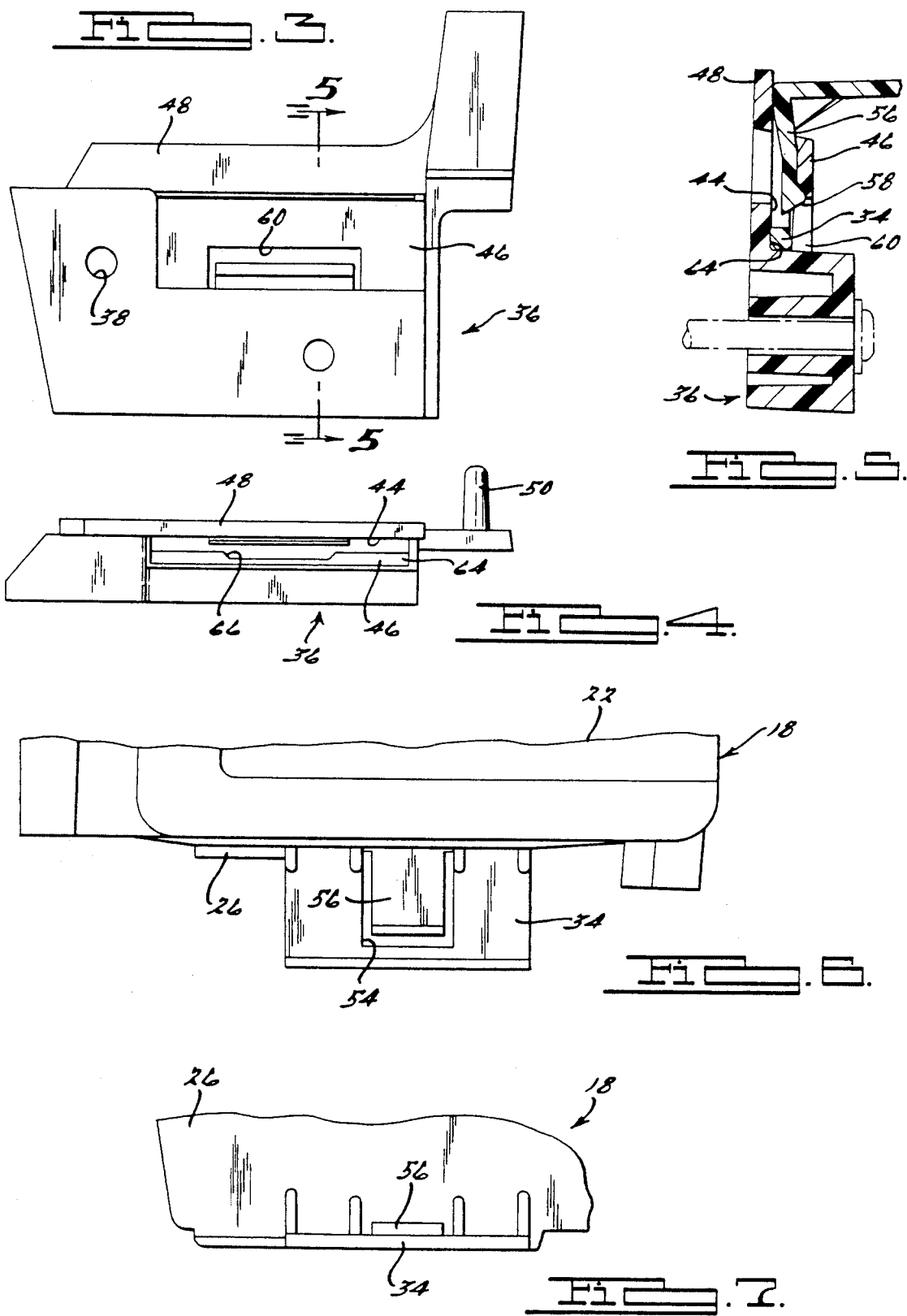

VEHICLE TAIL LIGHT CONSTRUCTION

BACKGROUND OF THE INVENTION

1. Field of the Invention

A tail light construction is secured to a vehicle body by means of fasteners in combination with a tab construction.

2. Prior Art

In modern vehicle construction, it is desired to hide the heads of any screws or other fasteners which are used to attach tail light assemblies to a vehicle. It is considered aesthetically undesirable to have externally visible fasteners on the exterior of vehicles. One technique which has been used in the past to attach the tail light assemblies in place without the fasteners being externally visible has been to provide interior screws which are set from inside the space behind the tail light assembly. However, in some vehicle designs, it is either impossible or very inconvenient or expensive to provide for such interior screw mounting.

In the present invention, means have been provided for securing the lower portion of the tail light assembly to a vehicle using a bracket and tab means. The bracket and tab means are hidden behind bumper fascia so that they are not externally visible. The upper portion of the tail light assembly is secured in place by means of fasteners. However, the fasteners are normally hidden from view by the lift gate provided on the rear of the vehicle. When the lift gate is closed, the heads of the fasteners cannot be seen. Thus, a relatively inexpensive technique has been provided for achieving the desired end of making the fastening devices not externally visible while avoiding the necessity for setting screw means from a point behind the tail light assembly.

SUMMARY OF THE INVENTION

A tail light assembly is provided for a vehicle wherein the lower portion of the tail light assembly is covered by vehicle bumper fascia structure so as to not be externally visible. The tail light assembly includes a main body portion having an upper end and a lower end. The upper end includes opening means to receive fasteners for securing the upper end to a vehicle body structure. The lower end includes a downwardly depending first tab.

A bracket is provided. The bracket has opening means to receive fasteners for securing the bracket to vehicle body structure in a position adjacent to the lower end of the main body portion of the tail light assembly. The bracket has a pocket to receive the first tab. The first tab has an opening therein. The lower end of the main body portion has a downwardly depending second tab positioned within the lastmentioned opening. The second tab is flexible and angled outwardly with respect to the first tab. The second tab includes a tang. The bracket includes detent means to receive the tang and yieldingly maintain the first and second tabs within the bracket pocket.

The lower portion of the pocket of the bracket narrows to firmly wedge the lower portion of the first tab in place. The pocket of the bracket has an indentation therewithin to receive and guide the second tab into the pocket. The first and second tabs are formed integrally with the main body portion of the tail light assembly.

IN THE DRAWINGS

FIG. 1 is a view in perspective of the right rear corner of a small van upon which a tail light assembly in accordance with one embodiment of the present invention has been mounted;

FIG. 2 is an exploded view in perspective of the tail light assembly and associated vehicle structure of FIG. 1;

FIG. 3 is a front elevational view of the bracket forming part of the tail light assembly;

FIG. 4 is a top plan view of the bracket of FIG. 3;

FIG. 5 is a sectional view taken substantially along the line 5—5 of FIG. 3 looking in the direction of the arrows and with the tail light assembly tabs received thereon;

FIG. 6 is a plan view of the rearward portion of the tail light assembly; and

FIG. 7 is an elevational view of the structure illustrated in FIG. 6.

DETAILED DESCRIPTION OF A PREFERRED EMBODIMENT

Referring to FIGS. 1 and 2, it will be noted that a vehicle body 10, representatively the right rear section of a mini-van 11, has a tail light opening 12 and a lift gate opening 14 adjacent thereto. A conventional lift gate 16 is hinged to body 10 at its upper end and is adapted to swing up and down to open and close the lift gate opening 14. A tail light assembly 18 is mounted in the tail light opening 12. As will be noted in FIG. 1, the lift gate 16 obscures the upper surface of the tail light assembly 18 when the lift gate is in the closed position. Bumper fascia 20 is secured in place and obscures the lower surface of tail light assembly 18. In modern vehicle design, it is desired to obscure all mounting structure of tail light assemblies as this structure is not considered to be visually pleasing. It is, however, acceptable to have such structure visible when doors, lift gates and the like are opened. The provision of the bumper fascia 20 on the lower portion of the tail light assembly accomplishes the obscuring purpose. However, as will be appreciated, if it is necessary to service the tail light assembly 18, the bumper fascia 20 obstructs the lower portion of the tail light assembly 18 thereby making it difficult to remove the tail light assembly for service purposes. In order to facilitate servicing of the tail light assembly, a mounting structure is provided which does not require removal of fastening means or the like in order to remove the tail light assembly for service purposes.

The tail light assembly 18 includes a main body portion 22 having an upper end 24 and a lower end 26. The main body portion 22 includes housing structure, lens structure and socket structure for bulbs as is conventional. The upper end 24 includes openings 28 to receive threaded fasteners 30 which are threadingly received in openings 32 provided in the vehicle body. This secures the upper end 24 to the vehicle body structure.

The lower end 26 includes a downwardly depending first tab 34. A bracket 36 is provided beneath the lower end 26. The bracket 36 has openings 38 through which threaded fasteners 40 extend into threaded engagement with openings 42 provided in the vehicle body in a position adjacent to the lower end of the main body portion 22.

The bracket 36 includes a pocket 44 which is defined by spaced apart wall members 46, 48. A locating pin 50 is provided on the inner surface of the wall member 36. The pin 50 is received in body opening 52 to properly position the bracket 36. The pocket 44 is provided to receive the first tab 34.

The first tab 34 has a opening 54 therein. The lower end 26 of the main body portion 22 has a downwardly depending second tab 56 positioned within the opening 52. The second tab 56 is flexible and angled outwardly with respect to the first tab 34 as will be noted in FIG. 5. The main body portion 22 of the tail light assembly is preferably fabricated of a plastic material.

The second tab 56 includes a tang 58. The bracket includes detent means comprising an opening 60 having an angled edge which receives the tang 58 as shown in FIG. 5 to yieldingly maintain the first and second tabs 34, 56 within the bracket pocket 44. As will be noted in FIGS. 4 and 5, the lower portion 64 of the pocket 44 narrows to firmly wedge the lower portion of the first tab 34 in place. The pocket 44 has an indentation 66 therewithin to receive and guide the second tab 56 into the pocket 44. The first and second tabs 34, 56 are formed integrally with the main body portion 22 of the tail light assembly to avoid the need for extra parts which require separate mounting and fabrication.

In assembly of the tail light assembly 18, the bracket 36 is first mounted in place by means of the threaded fasteners 40. The first and second tabs 34, 56 are then inserted into the pocket 44. At this point, the upper end 24 of the tail light assembly is secured to the vehicle body by means of the threaded fasteners 30. In order to service the tail light assembly 18, it is only necessary to remove the fasteners 30 and pull the tabs 34, 56 out of the pocket 44. This is, of course, done with the lift gate 16 in the open position. The tail light assembly 18 may be easily reassembled after servicing by again inserting the tabs 34, 56 into the pocket 44 and threading the fasteners 40 back into the openings 42.

I claim:

1. A tail light assembly for a vehicle wherein the lower portion of the tail light assembly is covered by vehicle bumper fascia structure, the tail light assembly including a main body portion having an upper end and a lower end, the upper end including opening means to receive fasteners for securing the upper end to a vehicle body structure, the lower end including a downwardly depending first tab, a bracket, the bracket having opening means to receive fasteners for securing the bracket to vehicle body structure in a position adjacent to the lower end of said main body portion, the bracket having a pocket to receive the first tab, the first tab having an opening therein, said lower end of the main body portion having a downwardly depending second tab positioned within said lastmentioned opening, the second tab being flexible and angled outwardly with respect to the first tab, the second tab including a tang, the bracket including detent means to receive the tang and yieldingly maintain the first and second tabs within the bracket pocket.

2. A tail light assembly as defined in claim 1, wherein the lower portion of the pocket of the bracket narrows to firmly wedge the lower portion of the first tab in place.

3. A tail light assembly as defined in claim 1, wherein the pocket of the bracket has an indentation therewithin to receive and guide the second tab into the pocket.

4. A tail light assembly as defined in claim 1, wherein the first and second tabs are formed integrally with the main body portion of the tail light assembly.

* * * * *